(12) United States Patent
Wang

(10) Patent No.: US 7,410,700 B2
(45) Date of Patent: Aug. 12, 2008

(54) WEATHERABLE MULTILAYER ARTICLES AND METHOD FOR THEIR PREPARATION

(75) Inventor: Hua Wang, Clifton Park, NY (US)

(73) Assignee: Sabic Innovative Plastic IP B.V. (NL)

( * ) Notice: Subject to any disclaimer, the term of this patent is extended or adjusted under 35 U.S.C. 154(b) by 565 days.

(21) Appl. No.: 10/371,754

(22) Filed: Feb. 21, 2003

(65) Prior Publication Data

US 2004/0028907 A1 Feb. 12, 2004

Related U.S. Application Data

(63) Continuation-in-part of application No. 10/012,136, filed on Nov. 30, 2001, now abandoned.

(51) Int. Cl.
B27B 27/36 (2006.01)

(52) U.S. Cl. ............. 428/412; 428/423.1; 264/176.1; 264/219

(58) Field of Classification Search ............ 428/412, 428/422.8, 423.7, 480, 323, 327, 380, 35.7, 428/35.8, 35.9, 423.1; 525/133, 191; 427/407.1; 264/176.1, 219, 241, 250
See application file for complete search history.

(56) References Cited

U.S. PATENT DOCUMENTS

| | | | |
|---|---|---|---|
| 2,901,466 A | 8/1959 | Kibler et al. | |
| 2,999,835 A | 9/1961 | Goldberg | |
| 3,028,365 A | 4/1962 | Schnell et al. | |
| 3,153,008 A | 10/1964 | Fox | |
| 3,169,121 A | 2/1965 | Goldberg | |
| 3,207,814 A | 9/1965 | Goldberg | |
| 3,309,261 A | 3/1967 | Schiller et al. | |
| 3,334,154 A | 8/1967 | Kim | |
| 3,391,054 A | 7/1968 | Lewis et al. | |
| 3,444,412 A | 5/1969 | Young et al. | |
| 3,460,961 A | 8/1969 | Young et al. | |
| 3,492,261 A | 1/1970 | Young et al. | |
| 3,503,779 A | 3/1970 | Young et al. | |
| 3,505,160 A | 4/1970 | Michaels et al. | |
| 3,764,457 A | 10/1973 | Chang et al. | |
| 3,791,914 A | 2/1974 | Ammons et al. | |
| 3,806,486 A | 4/1974 | Endriss et al. | |
| 3,965,057 A | 6/1976 | Ammons et al. | |
| 3,989,672 A | 11/1976 | Vestergaard | |
| 4,018,750 A | 4/1977 | Onizawa | |
| 4,123,436 A | 10/1978 | Holub et al. | |
| 4,131,575 A | 12/1978 | Adelmann et al. | |
| 4,156,069 A | 5/1979 | Prevorsek et al. | |
| 4,194,038 A | 3/1980 | Baker et al. | |
| 4,217,438 A | 8/1980 | Brunelle et al. | |
| 4,238,596 A | 12/1980 | Quinn | |
| 4,238,597 A | 12/1980 | Markezich et al. | |
| 4,487,896 A | 12/1984 | Mark et al. | |
| 4,503,121 A | 3/1985 | Robeson et al. | |
| 4,506,065 A | 3/1985 | Miller et al. | |
| 4,576,842 A | 3/1986 | Hartsing et al. | |
| 4,643,937 A | 2/1987 | Dickinson et al. | |
| 4,786,692 A | 11/1988 | Allen et al. | |
| 4,931,364 A | 6/1990 | Dickinson | |
| 4,992,322 A | 2/1991 | Curry et al. | |
| 5,001,000 A | 3/1991 | Rohrbacher et al. | |
| 5,001,193 A | 3/1991 | Golden | |
| 5,030,505 A | 7/1991 | Dickinson | |
| 5,103,336 A * | 4/1992 | Sieloff ..................... 359/253 | |
| 6,180,195 B1 | 1/2001 | Ellison et al. | |
| 6,306,507 B1 * | 10/2001 | Brunelle et al. .......... 428/423.7 | |

FOREIGN PATENT DOCUMENTS

| | | |
|---|---|---|
| EP | 1316419 A2 | 6/2003 |
| JP | 1-199841 | 8/1998 |
| WO | 61664 | 10/2000 |

OTHER PUBLICATIONS

Copending U.S. Appl. No. 10/012,136.*
Copending U.S. Appl. No. 10/210,746.*
Irving Skeist, "Handbook of Adhesives," Van Nostrand Reinhold, New York, Third Edition (1990), pp. 359-380.
A. Pizzi and K.L. Mittal, Handbook of Adhesive Technology," Marcel Dekker, Inc., New York—Basel—Hong Kong, pp. 405-429 (1994).
S.M. Cohen, R.H. Young and A.K. Markhart, "Transparent Ultraviolet-Barrier Coatings," Journal of Polymer Science, Part A-1, vol. 9, 3263-3299 (1971).
European Search Report; Application No. 02 258 262.1-2124, dated Mar. 21, 2005; 3 pages.

* cited by examiner

*Primary Examiner*—Thao Tran
(74) *Attorney, Agent, or Firm*—Cantor Colburn LLP

(57) ABSTRACT

Disclosed are weatherable multilayer articles comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) an adhesive layer comprising a polyurethane, and (iv) a substrate layer, wherein the coating layer is in contiguous superposed contact with the second layer, and the adhesive layer is in contiguous contact with the second layer and the substrate layer. Also disclosed is a method for making the multilayer article.

64 Claims, No Drawings

WEATHERABLE MULTILAYER ARTICLES AND METHOD FOR THEIR PREPARATION

CROSS REFERENCE TO RELATED APPLICATIONS

This application is a continuation-in-part of U.S. application Ser. No. 10/012,136, filed Nov. 30, 2001, now abandoned which is incorporated herein by reference.

BACKGROUND OF INVENTION

The present invention relates to weatherable multilayer resinous articles and their preparation. More particularly, it relates to multilayer articles comprising a protective block copolyestercarbonate coating, a second layer comprising a polymer comprising carbonate structural units, a substrate, and at least one adhesive layer between the second layer and the substrate.

Various resinous articles have a problem of long term color instability. This causes yellowing of the polymer resin, which in some embodiments detracts from its transparency and attractiveness. Loss of gloss can also be an undesirable long term phenomenon.

Yellowing of polymers is often caused by the action of ultraviolet radiation, which is why such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds and they must be employed at relatively low levels, typically up to 1% by weight, to avoid degradation of the physical properties of the polymer such as impact strength and high temperature properties as reflected in heat distortion temperature. Such levels may be inadequate to afford sufficient protection.

One way of protecting a resinous article against photoyellowing and loss of gloss is to apply a coating of a weatherable second polymer, the term "weatherable" as used herein signifying resistance to such phenomena. Weatherable polymers suitable for this purpose include resorcinol isophthalate/terephthalate copolyarylates. This is the subject of Cohen et al., *J. Poly. Sci., Part A*-1, 9, 3263-3299 (1971), and certain related U.S. patents of Monsanto Company including U.S. Pat. Nos. 3,444,129, 3,460,961, 3,492,261 and 3,503,779. Commonly owned, published application WO 00-61664 is directed to weatherable multilayer articles with coating layers comprising structural units derived from a 1,3-dihydroxybenzene organodicarboxylate. Commonly owned U.S. Pat. No. 6,306,507 is directed to weatherable multilayer articles with coating layers comprising at least one coating layer thereon, said coating layer comprising a thermally stable polymer comprising resorcinol arylate polyester chain members substantially free of anhydride linkages linking at least two mers of the polymer chain, prepared by an interfacial method.

Japanese Kokai 1/199,841 discloses articles having a substrate layer comprising at least 90 mole percent poly(ethylene terephthalate) and a gas barrier coating layer which is a polyester of resorcinol and isophthalic acid, optionally with copolyester units derived from another dicarboxylic acid such as terephthalic acid, naphthalenedicarboxylic acid or various other specifically named dicarboxylic acids. The disclosed articles may be prepared by a series of operations including co-injection molding which are essentially performed entirely in the melt, thereby overcoming the aforementioned deficiencies of solution coating. However, the only types of articles disclosed are bottles, which are produced from a co-injection molded parison by subsequent blow molding. Larger articles intended for outdoor use, such as external automobile body parts, are not disclosed and no method for their production is suggested, nor are articles in which the substrate layer is anything other than poly(ethylene terephthalate).

It remains of interest, therefore, to develop a method for preparing weatherable multilayer articles which are capable of use for such varied purposes as body parts for outdoor vehicles and devices such as automobiles, and which exhibit adequate adhesion between the various layers.

SUMMARY OF INVENTION

The present inventors have discovered multilayer articles with coating layers which provide protection from weathering for underlying layers, and which exhibit excellent adhesion between the various layers. In one of its embodiments the present invention comprises a multilayer article comprising (i) a coating layer comprising a block copolyestercarbonate comprising structural units derived from at least one 1,3-dihydroxybenzene and at least one aromatic dicarboxylic acid, (ii) a second layer comprising a polymer comprising carbonate structural units, (iii) an adhesive layer comprising a polyurethane, and (iv) a substrate layer, wherein the coating layer is in contiguous contact with the second layer, and the adhesive layer is in contiguous contact with the second layer and the substrate layer.

Various other features, aspects, and advantages of the present invention will become more apparent with reference to the following description and appended claims.

DETAILED DESCRIPTION

The copolyestercarbonate film in the multilayer articles of the present invention comprises at least one block copolyestercarbonate comprising alternating carbonate and arylate blocks. Such block copolyestercarbonates include polymers comprising 1,3-dihydroxybenzene structural units and aromatic dicarboxylic acid structural units of the Formula (I):

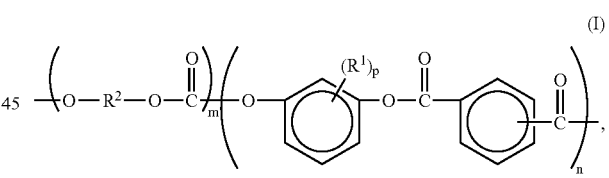

wherein each $R^1$ is independently halogen or $C_{1-12}$ alkyl, p is 0-3, each $R^2$ is independently a divalent organic radical, m is at least 1 and n is at least about 4. In some embodiments n is at least about 10, in other embodiments at least about 20 and in still other embodiments about 30-150. In some embodiments m is at least about 3, in other embodiments at least about 10 and in still other embodiments about 20-200. In other embodiments m is between about 20 and 50. Within the context of the invention "alternating carbonate and arylate blocks" means that the copolyestercarbonates comprise at least one carbonate block and at least one arylate block. In particular embodiments block copolyestercarbonates comprise at least one arylate block and at least two carbonate blocks. In another particular embodiment block copolyestercarbonates comprise an A-B-A architecture with at least one arylate block ("B") and at least two carbonate blocks ("A").

The arylate blocks contain structural units comprising 1,3-dihydroxybenzene moieties which may be unsubstituted or substituted. Alkyl substituents, if present, are often straight-chain or branched alkyl groups, and are most often located in the ortho position to both oxygen atoms although other ring locations are contemplated. Suitable $C_{1-12}$ alkyl groups include, but are not limited to, methyl, ethyl, n-propyl, iso-propyl, butyl, iso-butyl, t-butyl, nonyl, decyl, and aryl-substituted alkyl, including benzyl. In some embodiments any alkyl substituent is methyl. Suitable halogen substituents include bromo, chloro, and fluoro. 1,3-Dihydroxybenzene moieties containing a mixture of alkyl and halogen substituents are also suitable. The value for p may be in one embodiment 0-3, in another embodiment 0-2, and in still another embodiment 0-1. In one embodiment a 1,3-dihydroxybenzene moiety is 2-methylresorcinol. In many embodiments a 1,3-dihydroxybenzene moiety is unsubstituted resorcinol in which p is zero. Polymers containing mixtures of 1,3-dihydroxybenzene moieties, such as a mixture of unsubstituted resorcinol with 2-methylresorcinol are also contemplated.

In the arylate structural units said 1,3-dihydroxybenzene moieties are bound to aromatic dicarboxylic acid moieties which may be monocyclic moieties, such as isophthalate or terephthalate or their halogen-substituted derivatives; or polycyclic moieties, illustrative examples of which include biphenyl dicarboxylate, diphenylether dicarboxylate, diphenylsulfone dicarboxylate, diphenylketone dicarboxylate, diphenylsulfide dicarboxylate, or naphthalenedicarboxylate. In some embodiments polycyclic moieties comprise naphthalene-2,6-dicarboxylate; or mixtures of monocyclic and/or polycyclic aromatic dicarboxylates. In many embodiments the aromatic dicarboxylic acid moieties are isophthalate and/or terephthalate. Either or both of said moieties may be present. In one embodiment both are present in a molar ratio of isophthalate to terephthalate in the range of about 0.20-5.0:1, while in another embodiment both are present in a molar ratio of isophthalate to terephthalate in the range of about 0.25-4.0:1. When the isophthalate to terephthalate ratio is greater than about 4.0:1, then unacceptable levels of cyclic oligomer may form in some embodiments. When the isophthalate to terephthalate ratio is less than about 0.25:1, then unacceptable levels of insoluble polymer may form in some other embodiments. In some embodiments the molar ratio of isophthalate to terephthalate is about 0.40-2.5:1, and in other embodiments about 0.67-1.5:1.

In various embodiments the arylate block segments in the copolyestercarbonates are substantially free of anhydride linkages linking at least two mers of the polymer chain. Substantially free of anhydride linkages in the present context means that the copolyestercarbonates show decrease in molecular weight in some embodiments of less than 10% and in other embodiments of less than 5% upon heating said copolyestercarbonates at a temperature of about 280-290° C. for five minutes.

In the carbonate blocks of the copolyestercarbonates each $R^2$ of Formula (I) is independently an organic radical derived from a dihydroxy compound. For the most part, at least about 60 percent of the total number of $R^2$ groups in the polymer are aromatic organic radicals and the balance thereof are aliphatic, alicyclic, or aromatic radicals. Suitable $R^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438. In some embodiments of the invention dihydroxy compounds include 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl)propane (commonly known as bisphenol-A); 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,4'-dihydroxydiphenylmethane; bis(2-hydroxyphenyl)methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; 3,5,3',5'-tetrachloro-4,4'-dihydroxyphenyl)propane; 2,4'-dihydroxyphenyl sulfone; 2,6-dihydroxy naphthalene; hydroquinone, resorcinol; $C_{1-3}$ alkyl-substituted resorcinols. In a particular embodiment the dihydroxy compound comprises bisphenol A.

Suitable dihydroxy compounds also include those containing indane structural units such as represented by the Formula (II), which compound is 3-(4-hydroxyphenyl)-1,1,3-trimethylindan-5-ol, and by the Formula (III), which compound is 1-(4-hydroxyphenyl)-1,3,3-trimethylindan-5-ol:

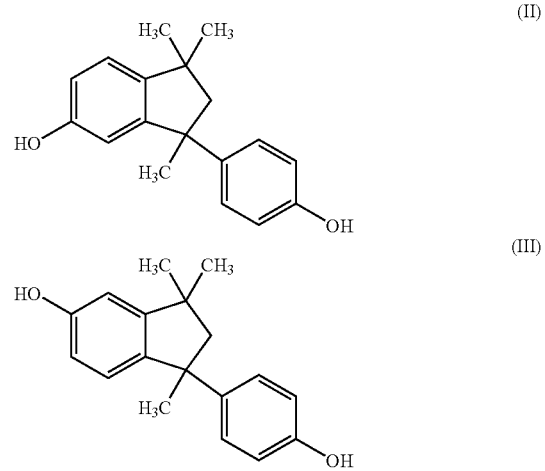

Included among suitable dihydroxy-substituted aromatic hydrocarbons are the 2,2,2',2'-tetrahydro-1,1'-spirobi[1H-indene]diols having Formula (IV):

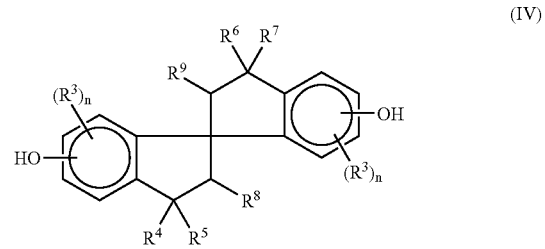

wherein each $R^3$ is independently selected from monovalent hydrocarbon radicals and halogen radicals; each $R^4$, $R^5$, $R^6$, and $R^7$ is independently $C_{1-6}$ alkyl; each $R^8$ and $R^9$ is independently H or $C_{1-6}$ alkyl; and each n is independently selected from positive integers having a value of from 0 to 3 inclusive. In a particular embodiment the 2,2,2',2'-tetrahydro- 1,1'-spirobi[1H-indene]-diol is 2,2,2',2'-tetrahydro-3,3,3',3'-tetramethyl-1,1'-spirobi[1H-indene]-6,6'-diol (sometimes know as "SBI").

The term "alkyl" as used in the various embodiments of the present invention is intended to designate both normal alkyl, branched alkyl, aralkyl, and cycloalkyl radicals. In various embodiments normal and branched alkyl radicals are those containing from 1 to about 12 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals represented are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 12 ring carbon atoms. Some illustrative non-limiting examples of these aryl radicals include phenyl, biphenyl, and naphthyl.

In some embodiments each $R^2$ is an aromatic organic radical and in particular embodiments a radical of the Formula (V):

$$-A^1-Y-A^2-, \qquad (V)$$

wherein each $A^1$ and $A^2$ is a monocyclic divalent aryl radical and Y is a bridging radical in which one or two carbon atoms separate $A^1$ and $A^2$. The free valence bonds in Formula (V) are usually in the meta or para positions of $A^1$ and $A^2$ in relation to Y. Compounds in which $R^2$ has Formula (V) are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In Formula (V), $A^1$ and $A^2$ typically represent unsubstituted phenylene or substituted derivatives thereof, illustrative substituents (one or more) being alkyl, alkenyl, and halogen (particularly bromine). In many embodiments $A^1$ and $A^2$ represent unsubstituted phenylene radicals. Both $A^1$ and $A^2$ may be p-phenylene, although both may be o- or m-phenylene or one o- or m-phenylene and the other p-phenylene.

The bridging radical, Y, is one in which one or two atoms, separate $A^1$ from $A^2$. In a particular embodiment one atom separates $A^1$ from $A^2$. Illustrative radicals of this type are —C=O, —O—, —S—, —SO— or —SO$_2$—, methylene, cyclohexylmethylene, 2-[2.2.1]-bicycloheptylmethylene, ethylene, isopropylidene, neopentylidene, cyclohexylidene, cyclopentadecylidene, cyclododecylidene, and adamantylidene. In some embodiments such radicals are gem-alkylene radicals. Also included, however, are unsaturated radicals. For reasons of availability and particular suitability for the purposes of this invention a particular bisphenol is 2,2-bis(4-hydroxyphenyl)propane (hereinafter referred to as bisphenol A or BPA), in which Y is isopropylidene and $A^1$ and $A^2$ are each p-phenylene.

Depending upon whether or not any unreacted 1,3-dihydroxybenzene moiety is present in the reaction mixture as described hereinafter, $R^2$ in the carbonate blocks may consist of or at least partially comprise a radical derived from a 1,3-dihydroxybenzene moiety. Therefore, in one embodiment of the present invention the copolyestercarbonates comprise carbonate blocks with $R^2$ radicals derived from a dihydroxy compound identical to at least one 1,3-dihydroxybenzene moiety in the polyarylate blocks. In another embodiment the copolyestercarbonates comprise carbonate blocks with $R^2$ radicals derived from a dihydroxy compound different from any 1,3-dihydroxybenzene moiety in the polyarylate blocks. In yet another embodiment the copolyestercarbonates comprise carbonate blocks containing a mixture of $R^2$ radicals derived from dihydroxy compounds at least one of which is the same as and at least one of which is different from any 1,3-dihydroxybenzene moiety in the polyarylate blocks. When a mixture of $R^2$ radicals derived from dihydroxy compounds is present, then the molar ratio of dihydroxy compounds identical to those present in the polyarylate blocks to those dihydroxy compounds different from those present in the polyarylate blocks is typically about 1:999 to 999:1. In some particular embodiments the copolyestercarbonates comprise carbonate blocks containing a mixture of $R^2$ radicals derived from at least two of unsubstituted resorcinol, a substituted resorcinol, and bisphenol A.

Diblock, triblock, and multiblock copolyestercarbonates are encompassed in the present invention. The chemical linkages between blocks comprising arylate chain members and blocks comprising organic carbonate chain members typically comprise a carbonate linkage between a diphenol residue of an arylate moiety and a —(C=O)—O— moiety of an organic carbonate moiety, although other types of linkages such as ester and/or anhydride are also possible. A typical carbonate linkage between said blocks is shown in Formula (VI), wherein $R^1$ and p are as previously defined:

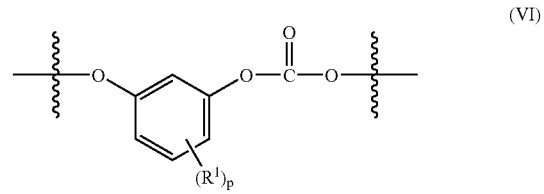

(VI)

In one embodiment the copolyestercarbonate is substantially comprised of a diblock copolymer with a carbonate linkage between an arylate block and an organic carbonate block. In another embodiment the copolyestercarbonate is substantially comprised of a triblock carbonate-ester-carbonate copolymer with carbonate linkages between the arylate block and organic carbonate end-blocks. Copolyestercarbonates with at least one carbonate linkage between an arylate block and an organic carbonate block are typically prepared from 1,3-dihydroxybenzene arylate-containing oligomers containing at least one and often two hydroxy-terminal sites (hereinafter sometimes referred to as hydroxy-terminated polyester intermediate).

In another embodiment the copolyestercarbonate comprises arylate blocks linked by carbonate linkages as shown in Formula (VII):

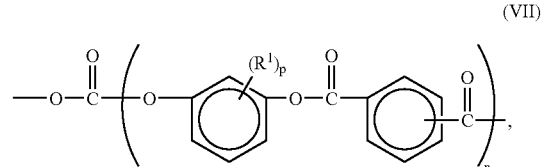

(VII)

wherein $R^1$, p, and n are as previously defined, and the arylate structural units are as described for Formula (I).

Copolyestercarbonates comprising Formula (VII) may arise from reaction of hydroxy-terminated polyester intermediate with a carbonate precursor in the substantial absence of any dihydroxy compound different from the hydroxy-terminated polyester intermediate. In other embodiments the copolyestercarbonate may comprise a mixture of copolyestercarbonates with different structural units and different architectures, for example as described herein.

In the copolyestercarbonates suitable for use in the present invention the distribution of the blocks may be such as to provide a copolymer having any desired weight proportion of arylate blocks in relation to carbonate blocks. The copolyestercarbonates contain in one embodiment about 5% to about 99% by weight arylate blocks; in another embodiment about 20% to about 98% by weight arylate blocks; in another embodiment about 40% to about 98% by weight arylate blocks; in another embodiment about 60% to about 98% by weight arylate blocks; in another embodiment about 80% to about 96% by weight arylate blocks; and in still another embodiment about 85% to about 95% by weight arylate blocks.

The copolyestercarbonate film can comprise other components such art-recognized additives including, but not limited to, stabilizers, color stabilizers, heat stabilizers, light stabilizers, auxiliary UW screeners, auxiliary UV absorbers, flame retardants, anti-drip agents, flow aids, plasticizers, ester interchange inhibitors, antistatic agents, mold release agents, and colorants such as metal flakes, glass flakes and beads, ceramic particles, other polymer particles, dyes and pigments which may be organic, inorganic or organometallic. In a particular embodiment a copolyestercarbonate-comprising layer is substantially transparent.

The thickness of the coating layer is sufficient to provide protection of the underlying layers from weathering, in particular from the effects of UV radiation, as measured, for example, by retention of such properties as gloss and by color stability in any colorant-comprising layer. In one embodiment the thickness of the coating layer is in a range of about 2-2,500 microns, in another embodiment in a range of about 10-250 microns, and in another embodiment in a range of about 50-175 microns.

If desired, an overlayer may be included over the coating layer, for example to provide abrasion or scratch resistance. In a particular embodiment a silicone overlayer is provided over a copolyestercarbonate-comprising coating layer.

Multilayer articles of the present invention comprise a second layer comprising a polymer comprising carbonate structural units. In one embodiment the polymer of the second layer comprises at least one homopolycarbonate. Any polycarbonate capable of being processed into a film or sheet is suitable. In various embodiments suitable polycarbonates comprise those with structural units derived from monomers selected from the group consisting of all those described above for use in the carbonate blocks of the block copolyestercarbonate. In particular embodiments polycarbonate film comprises bisphenol A homo- or copolycarbonates. In another particular embodiment polycarbonate film comprises bisphenol A homopolycarbonate. In other embodiments polycarbonate film comprises a blend of at least one first polycarbonate with at least one other polymeric resin, examples of which include, but are not limited to, a second polycarbonate differing from said first polycarbonate either in structural units or in molecular weight or in both these parameters, or a polyester, or an addition polymer such as acrylonitrile-butadiene-styrene copolymer or acrylonitrile-styrene-acrylate copolymer.

The second layer can comprise other components such as art-recognized additives including, but not limited to, stabilizers, color stabilizers, heat stabilizers, light stabilizers, UV screeners, UV absorbers, flame retardants, anti-drip agents, flow aids, plasticizers, ester interchange inhibitors, antistatic agents, mold release agents, fillers, and colorants such as metal flakes, glass flakes and beads, ceramic particles, other polymer particles, dyes and pigments which may be organic, inorganic or organometallic. In a particular embodiment a second layer further comprises at least one colorant. In another particular embodiment a second layer comprises both a bisphenol A polycarbonate and at least one colorant selected from the group consisting of dyes, pigments, glass flakes, and metal flakes. In a particular embodiment metal flake comprises aluminum flake. In another particular embodiment metal flake comprises aluminum flake which has dimensions of about 20-70 microns. Further examples of colorants include, but are not limited to, Solvent Yellow 93, Solvent Yellow 163, Solvent Yellow 114/Disperse Yellow 54, Solvent Violet 36, Solvent Violet 13, Solvent Red 195, Solvent Red 179, Solvent Red 135, Solvent Orange 60, Solvent Green 3, Solvent Blue 97, Solvent Blue 104, Solvent Blue 104, Solvent Blue 101, Macrolex Yellow E2R, Disperse Yellow 201, Disperse Red 60, Diaresin Red K, Colorplast Red LB, Pigment Yellow 183, Pigment Yellow 138, Pigment Yellow 110, Pigment Violet 29, Pigment Red 209, Pigment Red 209, Pigment Red 202, Pigment Red 178, Pigment Red 149, Pigment Red 122, Pigment Orange 68, Pigment Green 7, Pigment Green 36, Pigment Blue 60, Pigment Blue 15:4, Pigment Blue 15:3, Pigment Yellow 53, Pigment Yellow 184, Pigment Yellow 119, Pigment White 6, Pigment Red 101, Pigment Green 50, Pigment Green 17, Pigment Brown 24, Pigment Blue 29, Pigment Blue 28, Pigment Black 7, Lead Molybdates, Lead Chromates, Cerium Sulfides, Cadmium Sulfoselenide, and Cadmium Sulfide. Illustrative extending and reinforcing fillers include, but are not limited to, silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers.

The thickness of the second layer is in one embodiment in a range of about 2-2,500 microns, in another embodiment in a range of about 10-1,000 microns, and in another embodiment in a range of about 50-600 microns. An adhesive layer may optionally be present between the copolyestercarbonate-comprising coating layer and the second layer comprising carbonate structural units. In various embodiments said optional adhesive layers comprise those known in the art which provide adhesion to a surface or layer comprising a polymer comprising carbonate structural units. In some embodiments said optional adhesive layer is transparent and in other embodiments said optional adhesive layer has the same color as the second layer.

In various embodiments polyurethanes suitable for use in the adhesive layer of multilayer articles of the invention comprise those known in the art which provide adhesion to a surface or layer comprising a polymer comprising carbonate structural units. Polyurethane adhesives are described in many reference such as in Handbook of Adhesive Technology, edited by A. Pizzi and K. L. Mittal, Marcel Dekker, Inc., 1994, pages 405-429, and in Handbook of Adhesives, edited by I. Skeist, Van Nostrand Reinhold, third edition, 1990, pages 359-380, which are incorporated herein by reference. Polyurethane adhesives typically comprise long polyol chains that are tied together by shorter hard segments formed by diisocyanate and chain extenders, if present. The polyol chains are typically referred to as soft segments which impart low-temperature flexibility and room-temperature elastomeric properties. Generally, the higher the soft segment concentration, the lower will be the modulus, tensile strength, and hardness, while elongation will increase. In some embodiments polyols for polyurethane adhesives comprise at least one polyol from at least one of three categories: polyether polyols, polyester polyols, and polyols based on polybutadiene. In particular embodiment polyurethane adhesives comprise polyether polyols. In another particular embodiment polyurethane adhesives comprise a mixture of at least one polyether polyol and at least one polyester polyol. In some particular embodiments polyols comprise polytetramethylene ether glycol.

In particular embodiments suitable polyurethane adhesives include either one-component or two-component adhesive formulations. In particular embodiments suitable polyurethane adhesives include two-component adhesives which typically comprise a low-equivalent-weight isocyanate or isocyanate prepolymer that is cured with at least one of a low-equivalent-weight polyol or polyamine. In some embodiments suitable two-component adhesives comprise polymeric MDI (methylene diphenyl diisocyanate) as one component and mixtures of amines and hydroxy-containing compounds as a second component. In other embodiments suitable polyurethane adhesives comprise methylene biscyclohexyl diisocyanate. The two-component adhesive may further comprise at least one filler such as crystalline silica or quartz, or carbon black.

In other embodiments polyurethane adhesives comprise a copolymer comprising polyurethane structural units. In a particular embodiment the polyurethane adhesive comprises a block copolymer comprising a thermoplastic polyurethane block. In another particular embodiment the polyurethane adhesive comprises a block copolymer comprising a thermoplastic polyurethane block and at least one block comprising structural units derived from styrene. In another particular embodiment the polyurethane adhesive comprises a block copolymer comprising a thermoplastic polyurethane block and a hydrogenated styrene block copolymer (HSBC) block. The HSBC block may be a hydrogenated styrene-diene block copolymer. Illustrative examples of such block copolymers include those available from Kuraray Corporation under the designation TU S5865.

In other embodiments suitable polyurethane adhesives are in the form of film or sheet, which in various embodiments may be optically clear or transparent. In a particular embodiment a suitable polyurethane adhesive film is an aliphatic thermoplastic polyurethane film. In various embodiments suitable polyurethane film has a softening point in one embodiment in a range of between about 70° C. and about 200° C., and in another embodiment in a range of between about 80° C. and about 160° C.

In various embodiments polyurethane adhesive layer thickness may be in a range of between about 8 microns and about 2500 microns; in other embodiments in a range of between about 25 microns and about 2000 microns; in other embodiments in a range of between about 50 microns and about 1500 microns; in other embodiments in a range of between about 100 microns and about 1300 microns; and in still other embodiments in a range of between about 500 microns and about 1300 microns. In some other embodiments polyurethane adhesive layer thickness may be in a range of between about 10 microns and about 650 microns; in other embodiments in a range of between about 25 microns and about 400 microns; and in still other embodiments in a range of between about 50 microns and about 260 microns.

In some embodiments of the present invention a polyurethane adhesive contains little or no free amine in the cured adhesive. Although the invention is not dependent upon any particular theory of operation, it is possible that amine groups may cause polycarbonate molecular weight degradation leading to deterioration in certain properties of the polycarbonate-comprising multilayer article. In some cases molecular weight degradation in the polycarbonate may result in decrease in adhesive strength under certain conditions such as after exposure to temperature-humidity cycle testing. In other embodiments a polyurethane adhesive further comprises additives known in the art including, but not limited to, adhesion promoters and tackifiers.

It is well known that mismatch between coefficients of thermal expansion (CTE) of a cap layer or coating layer and an underlying substrate may induce very high thermal stress and cause delamination in the final multilayer articles. In various embodiments the polyurethane adhesive layer can be formulated for applications with multilayer articles comprising said second layer and substrate layer with different coefficients of thermal expansion (CTE), for example, a high CTE second layer on a low CTE substrate. In various embodiments the polyurethane-comprising adhesive layer has a modulus at room temperature in one embodiment in a range of between about $10^5$ and about $10^9$ Pascals and in another embodiment in a range of between about $10^6$ and $10^8$ Pascals.

The material of the substrate layer in the articles of this invention may comprise at least one material selected from the group consisting of a thermoplastic resin, a thermoset resin, a metal, a ceramic, a glass, and a cellulosic material. There is no particular limitation on the thickness of the substrate layer provided that a multilayer article comprising the substrate can be processed into a final desired form. In a particular embodiment the material of the substrate layer may be at least one thermoplastic polymer, whether addition or condensation prepared. Thermoplastic polymers include, but are not limited to, polycarbonates, particularly aromatic polycarbonates, polyacetals, polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, copolyamides, polyesters, liquid crystalline polyesters, polyetheresters, polyetheramides, polyesteramides, and polyestercarbonates (other than those employed for the coating layer, as defined herein). In some embodiments polycarbonates and polyesters are preferred. A substrate layer may additionally contain art-recognized additives including, but not limited to, colorants, pigments, dyes, impact modifiers, stabilizers, color stabilizers, heat stabilizers, light stabilizers, UV screeners, UV absorbers, flame retardants, anti-drip agents, fillers, flow aids, plasticizers, ester interchange inhibitors, antistatic agents, and mold release agents.

Suitable substrate polycarbonates (sometimes referred to hereinafter as "PC") comprise those with structural units derived from monomers selected from the group consisting of all those described above for use in the carbonate blocks of the block copolyestercarbonate. In some embodiments the polycarbonates are bisphenol A homo- and copolycarbonates. In other embodiments a suitable polycarbonate is one which is different from that polycarbonate layer which is in contact with the copolyestercarbonate coating layer. In various embodiments the weight average molecular weight of a substrate polycarbonate ranges from about 5,000 to about 100,000; in other embodiments the weight average molecular weight of a substrate polycarbonate ranges from about 25,000 to about 65,000.

The polycarbonate substrate may also be a copolyestercarbonate (other than that copolyestercarbonate employed for the coating layer as defined herein). Such copolymers typically comprise, in addition to the organic carbonate units, ester units such as isophthalate and/or terephthalate. In various embodiments copolyestercarbonates which find use as substrates in the instant invention and the methods for their preparation are disclosed in, for example, U.S. Pat. Nos. 3,030,331; 3,169,121; 3,207,814; 4,194,038; 4,156,069; 4,238,596; 4,238,597; 4,487,896; and 4,506,065.

Polyester substrates include, but are not limited to, poly(alkylene dicarboxylates), especially poly(ethylene terephthalate) (sometimes referred to hereinafter as "PET"), poly(1,4-butylene terephthalate) (sometimes referred to hereinafter as "PBT"), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate). Also included are polyarylates, illustrative examples of which include those comprising structural units derived from bisphenol A, terephthalic acid, and isophthalic acid.

Suitable addition polymer substrates include homo- and copolymeric aliphatic, olefin and functionalized olefin polymers (which are homopolymers and copolymers comprising structural units derived from aliphatic olefins or functionalized olefins or both), and their alloys or blends. Illustrative examples include, but are not limited to, polyethylene, polypropylene, thermoplastic polyolefin (TPO), ethylene-propylene copolymer, poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) (PMMA), and polymers of alkenylaromatic compounds such as polystyrenes, including syndiotactic polystyrene. In some embodiments addition polymer substrates are polystyrenes and especially the so-called acrylonitrile-butadiene-styrene (ABS) and acrylonitrile-styrene-acrylate (ASA) copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polyamide or polyphenylene ether-polyester. Although the substrate layer may incorporate other thermoplastic polymers, the above-described polycarbonates and/or addition polymers often constitute the major proportion thereof.

The substrate layer in the multilayer articles of this invention may also comprise at least one of any cured or at least partially cured thermoset polymer (referred to sometimes for convenience as "thermoset polymer"). Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. In one embodiment of the invention the thermoset polymer substrate comprises a RIM material. In another embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset. In a particular embodiment a substrate of the invention comprises an acrylic ester-derived thermoset resin containing a polyphenylene ether.

In one embodiment of the invention a thermoplastic or thermoset substrate layer also incorporates at least one filler and/or colorant. Illustrative extending and reinforcing fillers, and colorants include silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In another embodiment the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Multilayer articles encompassed by the invention also include those comprising at least one glass layer. Typically any glass layer is a substrate layer, although multilayer articles comprising a copolyestercarbonate coating layer interposed between a glass layer and a substrate layer are also contemplated. Depending upon the nature of coating and glass layers, at least one adhesive interlayer may be beneficially employed between any glass layer and any copolyestercarbonate coating layer. The adhesive interlayer may be transparent, opaque or translucent. For some embodiments it is preferred that any such interlayer be optically transparent in nature and generally have a transmission of greater than about 60% and a haze value less than about 3% with no objectionable color.

Metal articles exposed to UV-light may exhibit tarnishing and other detrimental phenomena. In another embodiment the invention encompasses multilayer articles comprising at least one metal layer as substrate layer. Representative metal substrates include those comprising brass, aluminum, magnesium, chrome, iron, steel, copper, and other metals or alloys or articles containing them, which may require protection from UV-light or other weather phenomena.

For metals to be used for applications such as automotive body panels, pretreatment of the metal surface may be necessary to clean the metal surfaces, for example to improve adhesion by providing an inert surface comprising a chemical conversion coating, and/or to prevent the spread of corrosion.

Methods for surface treatment of metal substrates are known in the art and are described in many references, for example in *Automotive Paints and Coatings*, edited by G. Fettis, VCH Publishers, 1995. In some embodiments pretreatment is carried out in a number of stages, including 1) cleaning (rust removal, degreasing, rinsing), 2) chemical conversion coating, and 3) electrodeposition (normally referred as e-coating).

In another embodiment the present invention provides methods for making multilayer articles comprising the layer components described herein. In some embodiments the coating layer comprising a block copolyestercarbonate and the second layer comprising a polymer comprising carbonate structural units are formed into a copolyestercarbonate/carbonate-comprising polymer assembly comprising at least two layers. Such an assembly can be made by known methods such as by coextrusion of films or sheets of the two materials. In other embodiments such an assembly can be made by lamination, or solvent or melt coating. In a particular embodiment application of the coating layer to the second layer is performed in the melt. Suitable methods for application include fabrication of a separate sheet of coating layer followed by application to the second layer, as well as simultaneous production of both layers. Thus, there may be employed such illustrative methods as molding, compression molding, thermoforming, co-injection molding, coextrusion, overmolding, multi-shot injection molding, sheet molding and placement of a film of the coating layer material on the surface of the second layer followed by adhesion of the two layers, typically in an injection molding apparatus; e.g., in-mold decoration. These operations may be conducted under art-recognized conditions.

Assemblies comprising coating layer and second layer may comprise the combined thicknesses of the layers. Such an assembly has a thickness in some embodiments in a range between about 10 microns and about 2500 microns; in other embodiments in a range between about 10 microns and about 1000 microns; in other embodiments in a range between about 10 microns and about 500 microns; and in still other embodiments in a range between about 10 microns and about 250 microns.

In some embodiments the polyurethane adhesive layer in a paste or low viscosity liquid form may be applied by means known in the art, including, but not limited to, roller, brush, or spray with a wet film thickness of about 0.2 microns to about 1200 microns to a substrate. The copolyestercarbonate/carbonate-comprising polymer assembly can then be formed adjacent to the adhesion layer upon the substrate layer by use of known methods, for example lamination using heat and pressure as in compression molding or using other forming techniques such as vacuum forming or hydroforming. Alternatively, polyurethane adhesive layer in a paste or low viscosity liquid form may be applied by means known in the art to at least one side of said second layer either before or after formation of an assembly of second layer with coating layer, followed by formation and bonding of the combined layers adjacent to substrate. Alternatively, the said second layer can be formed adjacent to the substrate layer comprising a polyurethane adhesive, followed by formation of coating layer adjacent to the second layer. For polyurethane adhesive already in film form the adhesive layer can be formed adjacent to the copolyestercarbonate/carbonate-comprising polymer assembly either after or during a process (such as coextrusion) to make said assembly, and become an integral part of the film assembly which can be directly formed adjacent to the substrates using processes as described, for example by use of such means as heat and pressure. Alternatively, said second layer can be formed adjacent to thermoplastic polyurethane adhesive film for example by directly coextruding said layers together, followed by formation of an assembly with copolyestercarbonate coating layer using known methods such as lamination. The copolyestercarbonate/carbonate-comprising polymer assembly can be optionally thermoformed to the approximate shape of the article before molding. In various embodiments any formation step of one layer adjacent to another layer may be performed by known means such as by lamination.

It is also within the scope of the invention to apply in the melt a structure comprising the coating layer, second layer, and polyurethane adhesive layer to a substrate layer. This may be achieved by known methods, for example in one embodiment, by charging an injection mold with the structure comprising the coating layer, second layer, and polyurethane adhesive layer, and injecting the substrate behind it. By this method, in-mold decoration and the like are possible. In one embodiment both sides of the substrate layer may receive the other layers, while in another embodiment they are applied to only one side of the substrate layer.

The multilayer articles comprising the various layer components of this invention are typically characterized by the usual beneficial properties of the substrate layer, in addition to weatherability as may be evidenced by such properties as improved initial gloss, improved initial color, improved resistance to ultraviolet radiation and maintenance of gloss, improved impact strength, and resistance to organic solvents encountered in their final applications. Depending upon such factors as the coating layer/substrate combination, the multilayer articles may possess recycling capability, which makes it possible to employ the regrind material as a substrate for further production of articles of the invention. The multilayer articles often exhibit low internal thermal stress induced from CTE mismatch between layers. The multilayer articles may also possess excellent environmental stability, for example thermal and hydrolytic stability.

Multilayer articles which can be made which comprise the various layer components of this invention include articles for OVAD applications; exterior and interior components for aircraft, automotive, truck, military vehicle (including automotive, aircraft, and water-borne vehicles), scooter, and motorcycle, including panels, quarter panels, rocker panels, vertical panels, horizontal panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; counter tops; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; phone bezels; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples the copolyestercarbonate-polycarbonate film assembly comprised a layer of copolyestercarbonate film and a layer of polycarbonate film. The copolyestercarbonate film comprised a copolyestercarbonate with arylate structural units derived from unsubstituted resorcinol, isophthalic acid, and terephthalic acid, and carbonate structural units derived from bisphenol A. The polycarbonate film comprised bisphenol A polycarbonate. The abbreviation "PU" means polyurethane. The abbreviation "SMC" means sheet molding compound. SEPTON was obtained from Kuraray Corporation and was either polystyrene-b-poly(ethylene-propylene)-b-polystyrene copolymer (SEPS) or polystyrene-b-poly(ethylene-butylene)-b-polystyrene copolymer (SEBS) or polystyrene-b-poly(ethylene-ethylene/propylene)-b-polystyrene copolymer (SEBS) containing about 13-65 wt. % structural units derived from styrene. In a particular embodiment SEPTON 8006 was a polystyrene-b-poly(ethylene-butylene)-b-polystyrene copolymer (SEBS) containing about 33 wt. % structural units derived from styrene. KURAMIRON was obtained from Kuraray Corporation and was a thermoplastic polyurethane elastomer. In a particular embodiment KURAMIRON 8165 was a polyester type polyurethane. CYCOLAC was an acrylonitrile-butadiene-styrene (ABS) resin obtained from General Electric Plastics. CYCOLOY was a blend of bisphenol A polycarbonate and acrylonitrile-butadiene-styrene resin obtained from General Electric Plastics. GELOY was an acrylonitrile-styrene-acrylate (ASA) resin obtained from General Electric Plastics. GTX was a compatibilized blend of polyphenylene ether and polyamide obtained from General Electric Plastics. VALOX was a poly(butylene terephthalate) obtained from General Electric Plastics.

The abbreviation "TSN" means thermoset NORYL, a material obtained from General Electric Plastics. TSN comprised a major amount of a polyphenylene ether and a minor amount of a vinyl monomer composition, along with various amounts of fillers, additives, and curing agents. The polyphenylene ether was preferably a poly(2,6-dimethyl-1,4-phenylene ether) (PPE) or poly(2,6-dimethyl-14-phenylene-co-2,3,6-trimethyl-1,4-phenylene ether), wherein greater than 5%, more preferably greater than 50%, most preferably greater than 90% of the polyphenylene ether hydroxyl groups have been capped. The capping group may contain acrylic, methacrylic or allylic functionality, and preferably methacrylic functionality. The polyphenylene ether may contain internal olefinic groups produced, for example, by reaction of internal repeat units with a alkenyl halide or alkenoyl halide or unsaturated carboxylic acid anhydride, such as allyl bromides, methacrylic acid halides, or methacrylic acid anhydrides. Such reaction may take place in the presence or absence of a basic reagent such as an amine or alkyl lithium reagent. The vinyl monomer composition comprised one or more monomers selected from the group consisting of a styrenic, acrylic and allylic monomer, preferably a blend of two or more of these monomers; more preferably a blend of a styrenic and an acrylic monomer; and most preferably a blend of styrene and a polyfunctional acrylate. TSN may contain from 0.5-95%, preferably 5-60% and most preferably 10-50% by weight polyphenylene ether. TSN may also contain from 95-0.5% by weight of a vinyl monomer composition. Such compositions may further contain other initiators; colorants; fillers, both polymeric, organic and inorganic; additives such as mold release agents; low profile additives; and the like. Inorganic fillers such as calcium carbonate are often included at levels of 0-250 parts by weight based on the TSN composition. Various combinations possible in the thermoset NORYL composition are further described in U.S. Patent Application 20020028337.

Samples were cut into one-inch wide stripes and tested for peel resistance of the polyurethane adhesive bond using a 90-degree peel test with a crosshead separation speed of one inch per minute using an Instron testing device (Model 4505). This adhesion test method is well known to those skilled in the art and is generally described in such references as U.S. Pat. No. 3,965,057. The testing apparatus in this test procedure consisted of a series of movable rollers or supports which allowed the test specimen to be peeled at a constant 90-degree angle along its entire uncut length. The apparatus consisted of a series of five 0.5 inch rollers which were geometrically affixed to two side supports and a base plate. The two lower rollers were adjustable so that the apparatus could accommodate test specimens varying in thickness. A suitable top clamp was used for securing the plastic layer. The test specimen was 6 inches in length and 1 inch in width. It was insured that a portion of the test specimen remained unbonded. At least 3 specimens were tested for each adhesive sample. In the actual testing procedure, the fixture was affixed to the movable head of the testing machine in a position which would cause the peeled plastic layer to form a 90-degree angle with the test specimen during the test. The test specimen was positioned in the fixture and the free skin clamped securely. The clamp was then pinned to the top head of the testing machine. With no load on the test specimen, the weighing apparatus was then balanced to zero. Provision was made to autograph the peel load versus displacement of the head for a peel distance of at least 4 inches. Neglecting the first inch of peel, the load required to peel the plastic layer was taken from the autographic curve. The peel strength (P) was then calculated as follows:

$$P = \frac{\text{peeling load (Newtons)}}{\text{width of specimen (meters)}}.$$

EXAMPLES 1-3

Laminates of copolyestercarbonate-polycarbonate film assembly onto e-coated steel with PU adhesive tie-layer: The two-component PU tie-layer adhesives, ARALDITE 2040, 2042, and AW8680/HW8685, were obtained from Vantico Inc. (formerly Ciba Performance Specialty Polymers). ARALDITE 2040 comprised polymeric methylene diphenyl diisocyanate and a mixture of 2-hydroxypropylaniline, 1,2-diaminocyclohexane, 3-(triethoxysilyl)-1-propanamine, 2-ethyl-1,3-hexanediol, and quartz. ARALDITE 2042 comprised polymeric methylene diphenyl diisocyanate, 1,2-diaminocyclohexane, 2-ethyl-1,3-hexanediol, hydrogenated terphenyl, 2-hydroxypropylaniline, polybutadiene polyol, and quartz. AW8680/HW8685 comprised polymeric methylene diphenyl diisocyanate and a mixture of 2-hydroxypropylaniline, 1,2-diamino-cyclohexane, 2-ethyl-1,3-hexanediol, and carbon black. E-coated steel test panels were obtained from ACT Laboratories (ACT # APR 31330). The e-coated metal was electro-zinc galvanized steel typically used for automotive body panels which was cleaned, phosphate treated, and finally e-coated with PPG e-coating formulation (type ED5100). A copolyestercarbonate-polycarbonate film assembly was prepared by coextruding a 10 mil thick clear copolyestercarbonate film with a 20 mil thick pigmented, cranberry-colored polycarbonate layer containing metal flakes for metallic effects. The PU adhesive components were thoroughly mixed in paste form and uniformly applied to the dried e-coated metal substrates in a thin layer by using an application gun and attached static mixer pipe. A copolyestercarbonate-polycarbonate film assembly, which had been surface-washed with deionized water and oven dried, was then put on top of the adhesive with the polycarbonate film side in contact with the adhesive. This combined assembly was placed in a Carver press and heated on both sides under 689 kilopascals pressure for 10 to 90 minutes at temperatures given in the Table. The copolyestercarbonate-polycarbonate film assembly adhered well to the substrates. Samples were cut into one-inch wide stripes and tested for adhesion using a 90-degree peel test as described above. The adhesion strength of the tie layer with copolyestercarbonate-polycarbonate film assembly and metal substrate was measured by the peel force in Newtons per meter (N/m). The adhesion results are shown in Table 1.

TABLE 1

| Example | Adhesive | Molding temp. (° C.) | Molding time (min.) | Peel force (N/m) | Failure mode |
|---|---|---|---|---|---|
| 1 | ARALDITE 2040 | 100 | 30 | 5779 | Cohesive PU |
| 2 | ARALDITE 2042 | 100 | 10 | 4903 | Interfacial PU/steel |
| 3 | AW8680/ HW8685 | 60 | 90 | 4028 | Interfacial PC/PU |

In each example the adhesion strength of the copolyestercarbonate-polycarbonate film assembly to the metal substrate was found to be excellent.

EXAMPLES 4-5

Laminates of copolyestercarbonate-polycarbonate film assembly onto cleaned and chemical conversion coated steel with PU tie-layer: A laminate was prepared according to Examples 1-3 with copolyestercarbonate-polycarbonate film assembly onto a cold-roll steel test panel (cleaning and chemical conversion pretreated) obtained from ACT Laboratories (ACT # APR 32488) using PU adhesives. The adhesion results are shown in Table 2.

TABLE 2

| Example | Adhesive | Molding temp. (° C.) | Molding time (min.) | Peel force (N/m) | Failure mode |
|---|---|---|---|---|---|
| 4 | ARALDITE 2042 | 100 | 30 | 2802 | Interfacial PU/steel |
| 5 | ARALDITE 2040 | 100 | 10 | 2101 | Interfacial PU/steel |

In each example the adhesion strength of the copolyestercarbonate-polycarbonate film assembly to the metal substrate was found to be excellent.

EXAMPLES 6-7

Laminates of copolyestercarbonate-polycarbonate film assembly onto SMC with PU tie-layer: Smooth surface, class "A" SMC was received from the Budd Company (Budd product #DSM-971) and comprised unsaturated polyester resin with curing agents and fillers. SMC prepreg was cured into a large panel at 149° C. and 8273 kilopascals for 90 seconds. Test panels of dimension four-inches-by-six-inches were cut from the molded SMC panels and were cleaned with deionized water and dried. A laminate was prepared according to Examples 1-3 with copolyestercarbonate-polycarbonate film assembly onto the SMC test panel using PU adhesives. The adhesion results are shown in Table 3.

TABLE 3

| Example | Adhesive | Molding temp. (° C.) | Molding time (min.) | Peel force (N/m) | Failure mode |
|---|---|---|---|---|---|
| 6 | ARALDITE 2042 | 100 | 30 | 5954 | Interfacial PU/SMC |
| 7 | ARALDITE 2040 | 100 | 10 | 7005 | Cohesive PU |

In each example the adhesion strength of the copolyestercarbonate-polycarbonate film assembly to the cured thermoset substrate was found to be excellent.

EXAMPLES 8-9

Laminates of copolyestercarbonate-polycarbonate film assembly onto TSN with PU tie-layer: A TSN formulation was cured into a twelve-inch-by-twelve-inch panel at 150° C. for 4 minutes under 6894 kilopascals pressure. Test panels of four-inch-by-six-inch dimensions were cut from the molded TSN panels and were cleaned with deionized water and dried. A laminate was prepared according to Examples 1-3 with copolyestercarbonate-polycarbonate film assembly onto the TSN test panel using PU adhesives. The adhesion results are shown in Table 4.

TABLE 4

| Example | Adhesive | Molding temp. (° C.) | Molding time (min.) | Peel force (N/m) | Failure mode |
|---|---|---|---|---|---|
| 8 | ARALDITE 2042 | 100 | 30 | 2802 | Interfacial PU/TSN |
| 9 | ARALDITE 2040 | 100 | 10 | 2627 | Interfacial PU/TSN |

In each example the adhesion strength of the copolyestercarbonate-polycarbonate film assembly to the cured thermoset substrate was found to be excellent.

EXAMPLES 10-13

Laminates of copolyestercarbonate-polycarbonate film assembly onto e-coated steel and chemical conversion coated steel: Aliphatic thermoplastic polyurethane film, grades PE393 and PE399, of 50 mil thickness were obtained from JPS Elastomerics Corp. DUREFLEX A4700 polyurethane film of 50 mil thickness was obtained from Deerfield Urethane, Inc. Each type of PU film was laminated to a copolyestercarbonate-polycarbonate film assembly at 110° C. and 344 kilopascals for 2 minutes using a hot press. E-coated steel test panels were obtained from ACT Laboratories (ACT # APR26782). The e-coated metal was cold-roll steel which was cleaned, phosphate treated, and finally e-coated with PPG e-coating formulation. The copolyestercarbonate-polycarbonate film assembly with PU laminated to the polycarbonate side was then put on top of the e-coated steel substrate with PU film layer in contact with the metal surface. Each assembly was placed in a Carver press and heated on both sides under 689 kilopascals pressure and 127° C. for 10 minutes. The copolyestercarbonate-polycarbonate film assembly adhered well to the substrates. The adhesion strength of the tie layer with copolyestercarbonate-polycarbonate film assembly and metal substrate was measured by the peel force.

TABLE 5

| Example | Substrate | PU adhesive film | Peel force (N/m) | Failure mode |
|---|---|---|---|---|
| 10 | e-coated steel | PE393 | 13,414 | Interfacial PU/steel |
| 11 | e-coated steel | PE399 | 24,902 | Interfacial PU/steel |
| 12 | e-coated steel | A4700 | 20,944 | Interfacial PU/steel |
| 13 | pretreated steel | A4700 | 2504 | Interfacial PU/steel |

In each example the adhesion strength of the copolyestercarbonate-polycarbonate film assembly to the metal substrate was found to be excellent.

EXAMPLES 14-15

Laminates of copolyestercarbonate-polycarbonate film assembly onto e-coated Aluminum and chemical conversion coated Aluminum: E-coated aluminum test panels were obtained from ACT Laboratories (ACT # APR 41719). E-coated aluminum panels of the type used for automotive body panels had been cleaned, phosphate treated, and finally e-coated with PPG lead-free e-coating formulation. (type ED6100H). Pretreated aluminum panels (cleaned and chemical conversion pretreated using Henkel immersion phosphate) were also obtained from ACT Laboratories (ACT # APR 41718). Laminates were prepared according to Examples 10-13 (except as noted) with copolyestercarbonate-polycarbonate film assembly onto an aluminum substrate using the PU film adhesive DUREFLEX A4700 of 25 mil thickness. The adhesion results are summarized in Table 6.

TABLE 6

| Example | Substrate | Molding temp. (° C.) | Mold press. (kPa) | Peel force (N/m) | Failure mode |
|---|---|---|---|---|---|
| 14 | e-coated Al | 121 | 172 | 26,180 | Interfacial PU/Al & PU/PC |
| 15 | pretreated Al | 127 | 689 | 7968 | Interfacial PU/Al |

In each example the adhesion strength of the copolyestercarbonate-polycarbonate film assembly to the metal substrate was found to be excellent.

Adhesion Environmental Stability Tests

Adhesion environmental stability data for laminates of copolyestercarbonate-polycarbonate film assembly onto e-coated steel and SMC: Multilayer structures of copolyestercarbonate-polycarbonate film assembly over e-coated steel or SMC or e-coated aluminum, the same as those in examples 1-2 and 10-12, examples 6-7, and example 14, respectively, were prepared and subjected to a full cycle crack resistance test under varying conditions of temperature and humidity. Each full cycle involved holding the sample successively for 24 hours at 84° C., 16 hours at 38° C. and 98% relative humidity, 6 hours at minus 29° C., and 2 hours at 23° C. Each sample was subjected to 15 cycles. All samples were visually inspected after the full cycle crack test and were found to have no macroscopic delamination or other film-related failure. These four-inches-by-six-inches cycle cracked samples were then cut into one-inch-by-six-inches test specimen for 90-degree peel test at one inch per minute cross-head separation speed. The results are summarized in Table 7.

TABLE 7

| Example | Substrate | Adhesive/ Thickness of adhesive | Peel strength after cycle crack test (N/m) | Peel failure mode |
|---|---|---|---|---|
| 1 | e-coated steel | ARALDITE 2040 5 mil | 5779 | Cohesive PU and interfacial PC/PU |
| 2 | e-coated steel | ARALDITE 2042 5 mil | 175-525 | Interfacial PC/PU |
| 6 | SMC | ARALDITE 2040 20 mil | 3520 | Interfacial PC/PU |
| 7 | SMC | ARALDITE 2042 20 mil | 350 | Interfacial SMC/PU |
| 10 | e-coated steel | PE393 50 mil film | 17,845 | — |
| 11 | e-coated steel | PE399 50 mil film | 21,102 | — |
| 12 | e-coated steel | A4700 50 mil film | 28,387 | — |

TABLE 7-continued

| Example | Substrate | Adhesive/ Thickness of adhesive | Peel strength after cycle crack test (N/m) | Peel failure mode |
|---|---|---|---|---|
| 14 | e-coated Al | A4700 25 mil film | 24,201 | — |

The results showed that adhesion provided to copolyester-carbonate-polycarbonate film assembly and e-coated steel by ARALDITE 2040 and the three types of polyurethane film is environmentally stable, and adhesion strength remains excellent after the full cycle crack test protocol. Although the invention is not dependent upon any theory of action, this excellent adhesion stability may be due to the hydrolytic stability and/or low modulus of ARALDITE 2040 and of the three types of polyurethane film which allows them to accommodate any CTE mismatch between copolyestercarbonate-polycarbonate film assembly and low CTE substrates.

EXAMPLE 16

In-mold decoration: A block copolymer (sometimes designated hereinafter as "TU") comprising a thermoplastic polyurethane (PU) block and a hydrogenated styrene block copolymer (HSBC) block, TU S5865, was obtained from Kuraray Corporation. A 10 mil×3.5 inch×4 inch bisphenol A polycarbonate film was placed in a 3/16 inch×4 inch×4 inch plaque mold. TU S5865 copolymer was injection molded behind the polycarbonate film. The polycarbonate film was found to adhere well to the TU copolymer. The 90-degree peel force was found to be about 10,157 Newtons per linear meter; the film was torn during the peel test.

EXAMPLE 17

In-mold decoration: A blend ("AU50") was made by blending 100 parts of TU S5865 with 100 parts of SEPTON 8006, 100 parts of paraffinic oil, 200 parts of a thermoplastic polyurethane elastomer (KURAMIRON 8165, obtained from Kuraray Corporation), and minor amounts of hindered phenolic heat stabilizers and slipping agent montanic ester wax. A 10 mil×3.5 inch×4 inch bisphenol A polycarbonate film was placed in a 3/16 inch×4 inch×4 inch plaque mold. AU50 blend was injection molded behind the polycarbonate film. The polycarbonate film was found to adhere well to the AU50 blend. The 90-degree peel force was found to be about 9456 Newtons per linear meter; the failure mode was tearing of AU50.

EXAMPLE 18

In-mold decoration: A blend ("AU60") was made by blending 100 parts of TU S5865 with 100 parts of SEPTON 8006, 100 parts of paraffinic oil, 200 parts of a thermoplastic polyurethane elastomer (KURAMIRON 9190, obtained from Kuraray Corporation), and minor amounts of hindered phenolic heat stabilizers and slipping agent montanic ester wax. AU60 blend was injection molded behind a 10 mil thick bisphenol A polycarbonate film. The polycarbonate film was found to adhere well to AU60 blend. The 90-degree peel force was found to be about 13,834 Newtons per linear meter; the polycarbonate film was torn during the peel test.

EXAMPLES 19-26

In-mold decoration: In these examples Nylon 6 was obtained from Honeywell. All other resins were from GE Plastics. TU S5865 films of 1/16 inch×4 inch×6 inch in dimension were made by injection molding process. The film was placed in the cavity of a 3/16 inch×4 inch×4 inch plaque mold and thermoplastic resins, listed in Table 1, were injection molded behind the film to create in-mold decorated plaques with a TU S5865 resin layer and a substrate layer. The 90-degree peel strength was measured; data are listed in Table 8.

TABLE 8

| Example | Material | Peel Strength (N/m) | Failure Mode |
|---|---|---|---|
| 19 | CYCOLAC GPM 5500 | 4150 | Interfacial |
| 20 | CYCOLAC EPBM 3570 | 3782 | Interfacial |
| 21 | CYCOLAC X37 | 4098 | Interfacial |
| 22 | CYCOLOY MC8002 | 4168 | Interfacial |
| 23 | GELOY 4034 | 3993 | Interfacial |
| 24 | Nylon 6 (CAPRON 1250) | 3415 | Interfacial |
| 25 | GTX 902 | 2014 | Interfacial |
| 26 | VALOX 315 | 1979 | Interfacial |

COMPARATIVE EXAMPLES 1-4

The following multilayer articles contained no tielayer. A 30 mil×3.5 inch×4 inch copolyestercarbonate-polycarbonate film assembly was placed in the cavity of a 3/16 inch×4 inch×4 inch plaque mold. Various resins were injection molded behind the polycarbonate film of the film assembly. The 90-degree peel strength was measured; data are listed in Table 9. The copolyestercarbonate-polycarbonate film assembly was found to adhere poorly to these substrates without using a tielayer.

TABLE 9

| Comparative Examples | Material | Peel Strength (N/m) |
|---|---|---|
| C1 | CYCOLAC EPBM 3570 | <500 |
| C2 | CYCOLAC X37 | <500 |
| C3 | CYCOLOY MC8002 | 2224 |
| C4 | GELOY XP4025 | <500 |

EXAMPLES 27-34

In-mold decoration: AU50, a blend of TU polymer as described in Example 17, was made into films of 1/16 inch×4 inch×6 inch dimensions by an injection molding process. Since AU50 is a relative soft material and will tear if there is significant adhesion, a 7 mil bisphenol A polycarbonate film was laminated with the AU50 film before it was inserted into the mold. The film assembly was placed in the a 3/16 inch×4 inch×4 inch plaque mold and thermoplastic resins were injection molded behind the AU50 film of the film assembly to create an in-mold decorated plaque. The 90-degree peel strength was tested; data are listed in Table 10. In most cases, the failure mode was cohesive AU50 tielayer failure.

TABLE 10

| Example | Material | Peel Strength (N/m) | Failure Mode |
|---|---|---|---|
| 27 | CYCOLAC GPM 5500 | 5901 | Cohesive |
| 28 | CYCOLAC EPBM 3570 | 5621 | Cohesive |
| 29 | CYCOLAC X37 | 4588 | Cohesive |
| 30 | CYCOLOY MC8002 | 5096 | Cohesive |
| 31 | GELOY 4034 | 4781 | Cohesive |
| 32 | Nylon 6 | 4676 | Cohesive |
| 33 | GTX 902 | 5166 | Cohesive |
| 34 | VALOX 315 | 1979 | Interfacial |

EXAMPLES 35-42

In-mold decoration: AU60, a blend of TU polymer as described in Example 18, was made into films of 1/16 inch×4 inch×6 inch dimensions by an injection molding process. The film was placed in the cavity of a 3/16 inch×4 inch×4 inch plaque mold and thermoplastic resins were injection molded behind it to create an in-mold decorated plaque of such film with a substrate layer. The 90-degree peel strength was tested; data are listed in Table 11.

TABLE 11

| Example | Material | Peel Strength (N/m) | Failure Mode |
|---|---|---|---|
| 35 | CYCOLAC GPM 5500 | 5919 | Cohesive/Interfacial |
| 36 | CYCOLAC EPBM 3570 | 5306 | Cohesive/Interfacial |
| 37 | CYCOLAC X37 | 5901 | Cohesive/Interfacial |
| 38 | CYCOLOY MC8002 | 5429 | Cohesive/Interfacial |
| 39 | GELOY 4034 | 6059 | Cohesive/Interfacial |
| 40 | Nylon 6 | 5341 | Cohesive/Interfacial |
| 41 | GTX 902 | 2942 | Interfacial |
| 42 | VALOX 315 | 2312 | Interfacial |

EXAMPLE 43

Extrusion coating and in-mold decoration: A 10 mil thick AU50 layer was extrusion coated on the back of a 20 mil thick bisphenol A polycarbonate film at 216° C. The polycarbonate film with AU50 extrusion coated on the backside was then inserted in a 3/16 inch×4 inch×4 inch plaque mold, and CYCOLOY MC8002 resin was injection molded behind the AU50 film of the film assembly to make polycarbonate/AU50/CYCOLOY MC8002 multilayer articles. It was found that AU50 worked as an effective tie layer for polycarbonate adhesion to the CYCOLOY substrate. The peel strength was 5289 Newtons per linear meter and the failure mode was a combination of cohesive AU50 tielayer and interfacial failure.

EXAMPLE 44

After cycle crack adhesion strength: A film assembly of TU S5865 copolymer injection molded behind bisphenol A polycarbonate film as in example 16 was subjected to temperature and humidity cycling following the full cycle crack resistance test protocol described hereinabove. The peel strength after full cycle crack test protocol was found to be 9281 Newtons per linear meter.

EXAMPLE 45

After cycle crack adhesion strength: A film assembly of AU50 blend injection molded behind bisphenol A polycarbonate film as in example 17 was subjected to temperature and humidity cycling following the full cycle crack resistance test protocol described hereinabove. The peel strength after full cycle crack test protocol was found to be 10,332 Newtons per linear meter; the failure mode was tearing of AU50.

EXAMPLE 46

After cycle crack adhesion strength: A film assembly of AU60 blend injection molded behind a bisphenol A polycarbonate film as in example 18 was subjected to temperature and humidity cycling following the full cycle crack resistance test protocol described hereinabove. The peel strength after full cycle crack test protocol was found to be nearly 15,760 Newtons per linear meter. Polycarbonate film was torn during peel test.

EXAMPLES 47-53

After cycle crack adhesion strength: Film assemblies of thermoplastic resins injection molded behind a TU S5865 resin layer prepared in the same manner as in examples 19-26 were subjected to temperature and humidity cycling following the full cycle crack resistance test protocol described hereinabove. The peel strength data after full cycle crack test protocol are listed in Table 12.

TABLE 12

| Example | Material | Peel Strength (N/m) | Failure Mode |
|---|---|---|---|
| 47 | CYCOLAC GPM 5500 | 3625 | Interfacial |
| 48 | CYCOLAC EPBM 3570 | 2995 | Interfacial |
| 49 | CYCOLAC X37 | 3222 | Interfacial |
| 50 | CYCOLOY MC8002 | 3607 | Interfacial |
| 51 | GELOY 4034 | 3537 | Interfacial |
| 52 | GTX 902 | 1331 | Inteifacial |
| 53 | VALOX 315 | 946 | Interfacial |

EXAMPLES 54-60

After cycle crack adhesion strength: Film assemblies of thermoplastic resins injection molded behind a AU50 blend layer prepared in the same manner as in examples 27-34 were subjected to temperature and humidity cycling following the full cycle crack resistance test protocol described hereinabove. The peel strength data after full cycle crack test protocol are listed in Table 13.

TABLE 13

| Example | Material | Peel Strength (N/m) | Failure Mode |
|---|---|---|---|
| 54 | CYCOLAC GPM 5500 | 5534 | Cohesive |
| 55 | CYCOLAC EPBM 3570 | 5131 | Cohesive |
| 56 | CYCOLAC X37 | 5113 | Cohesive |
| 57 | CYCOLOY MC8002 | 4693 | Cohesive |
| 58 | GELOY 4034 | 4711 | Cohesive |
| 59 | GTX 902 | 5849 | Cohesive |
| 60 | VALOX 315 | 1664 | Interfacial |

While the invention has been illustrated and described in typical embodiments, it is not intended to be limited to the details shown, since various modifiactions and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents cited herein are incorporated herein by reference.

The invention claimed is:

1. A multilayer article comprising (i) a coating layer comprising a block copolyestercarbonate comprising structural units derived from a 1,3-dihydroxybenzene and an aromatic dicarboxylic acid, (ii) a second layer comprising a polymer comprising carbonate structural units, (iii) an adhesive layer comprising an aliphatic thermoplastic polyurethane film, wherein the adhesive layer comprises a block copolymer comprising a thermoplastic polyurethane block and a block comprising structural units derived from styrene, and (iv) a substrate layer, wherein the coating layer is in contiguous contact with the second layer, and the adhesive layer is in contiguous contact with the second layer and the substrate layer.

2. The article of 1, wherein the coating layer comprises a 1,3-dihydroxybenzene selected from the group consisting of unsubstituted resorcinol, 2-methyl resorcinol, and mixtures thereof.

3. The article of claim 2 wherein the 1,3-dihydroxybenzene is unsubstituted resorcinol.

4. The article of claim 1, wherein the aromatic dicarboxylic acid is selected from the group consisting of isophthalic acid, terephthalic acid, naphthalene-2,6-dicarboxylic acid, and mixtures thereof.

5. The article of claim 4 wherein the aromatic dicarboxylic acid is a mixture of isophthalic acid and terephthalic acid.

6. The article of claim 5 wherein the ratio of isophthalic-derived structural units to terephthalic-derived structural units is about 0.25-4.0:1.

7. The article of claim 5 wherein the ratio of isophthalic-derived structural units to terephthalic-derived structural units is about 0.40-2.5:1.

8. The article of claim 1, wherein the copolyestercarbonate comprises about 10% to about 99% by weight arylate blocks.

9. The article of claim 1, wherein the copolyestercarbonate comprises about 60% to about 98% by weight arylate blocks.

10. The article of claim 1, wherein the carbonate portion of the copolyestercarbonate comprises structural units derived from bisphenol A.

11. The article of claim 1, wherein the second layer comprises a bisphenol A polycarbonate.

12. The article of claim 1, wherein the second layer further comprises a colorant selected from the group consisting of dyes, pigments, metal flakes, and glass flakes.

13. The article of claim 1, wherein the thermoplastic polyurethane block comprises structural units derived from a polyol selected from the group consisting of polyether polyols, polyester polyols, and polyols based on polybutadiene.

14. The article of claim 13 wherein the polyurethane comprises structural units derived from polymeric methylene diphenyl diisocyanate.

15. The article of claim 1 wherein the block comprising structural units derived from styrene comprises a hydrogenated styrene-diene block.

16. The article of claim 1, wherein the multilayer article exhibits a ninety-degree peel force of at least 700 Newtons per meter.

17. The article of claim 16 wherein the multilayer article exhibits a ninety-degree peel force of at least 1750 Newtons per meter.

18. The article of claim 1, wherein the substrate layer comprises a material selected from the group consisting of a thermoplastic resin, a thermoset resin, a metal, a ceramic, a glass, and a cellulosic material.

19. The article of claim 18 wherein the substrate layer comprises a thermoplastic resin selected from the group consisting of condensation polymers, polycarbonates, aromatic polycarbonates, bisphenol A polycarbonate, polyacetals, polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, copolyamides, polyesters, liquid crystalline polyesters, polyetheresters, polyetheramides, polyesteramides, polyestercarbonates, poly(alkylene dicarboxylates), poly(ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), poly(1,4-cyclohexanedimethyl-1,4-cyclohexanedicarboxylate); polyarylates, a polyarylate comprising structural units derived from bisphenol A, terephthalic acid, and isophthalic acid; addition polymers, homo- and copolymeric aliphatic olefin and functionalized olefin polymers, polyethylene, polypropylene, thermoplastic polyolefin, ethylene-propylene copolymer, poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers, poly(meth)acrylamides, polyalkyl (meth)acrylates, poly(methyl methacrylate) polymers of alkenylaromatic compounds, polystyrenes, syndiotactic polystyrene; acrylonitrile-butadiene-styrene (ABS), and acrylonitrile-styrene-acrylate (ASA) copolymers; and blends thereof.

20. The article of claim 1, wherein thicknesses of layers are: a coating layer of about 2-2,500 microns; a second layer of about 2-2,500 microns; and an adhesive layer of about 8-2,500 microns.

21. The article of claim 1, which is an OVAD device; exterior or interior component for aircraft, automotive, truck, military vehicle; military automobile, military aircraft, military water-borne vehicle, scooter, motorcycle, including a panel, quarter panel, rocker panel, vertical panel, horizontal panel, trim, pillar, center post, fender, door, decklid, trunklid, hood, bonnet, roof, bumper, fascia, grill, mirror housing, pillar applique, cladding, body side molding, wheel cover, hubcap, door handle, spoiler, window frame, headlamp bezel, headlamp, tail lamp, tail lamp housing, tail lamp bezel, license plate enclosure, roof rack, or running board; an enclosure, housing, panel, or part for outdoor vehicles and devices; an enclosure for an electrical or telecommunication device; outdoor furniture; aircraft component; exterior or interior component for a boat or item of marine equipment, including trim, an enclosure, or housing; an outboard motor housing; depth finder housing, personal water-craft; jet-ski; pool; spa; hot-tub; step; step covering; a building or construction application including glazing, roof, window, floor, decorative window furnishing or treatment; a treated glass cover for a pictures, paintings, poster, or display item; an optical lens; ophthalmic lens; corrective ophthalmic lens; implantable ophthalmic lens; a wall panel or door; a counter top; protected graphic; an outdoor or indoor sign; an enclosure, housing, panel, or part for an automatic teller machine (ATM); an enclosure, housing, panel, or part for a lawn or garden tractor, lawn mower, or tool, including a lawn or garden tool; window or door trim; an item of sports equipment or a toy; an enclosure, housing, panel, or part for a snowmobile; a recreational vehicle panel or component; an item of playground equipment; a shoe lace; an articles made from plastic-wood combinations; a golf course marker; a utility pit cover; a computer housing; a desk-top computer housing; a portable computer housing; a lap-top computer housing; a palm-held computer housings; a monitor housing; a printer housing; a keyboard; a FAX machine housing; a copier housing; a telephone housing; a phone bezel; a mobile phone housing; a radio sender housing; a radio receiver housing; a light fixture; lighting appliance; reflector; network interface device housing; transformer housing; air conditioner housing; cladding or seating for public transportation; cladding or seating for a train, subway, or bus; a meter housing; antenna housing; cladding for satellite dishes; an coated helmet or item of personal protective equipment; a coated synthetic or natural textile; coated photographic film or photographic print; a coated painted article; coated dyed article; coated fluorescent article; or coated foam article.

22. A method for making a multilayer article comprising (i) a coating layer comprising a block copolyestercarbonate comprising structural units derived from a 1,3-dihydroxybenzene and an aromatic dicarboxylic acid, (ii) a second layer comprising a polymer comprising carbonate structural units, (iii) an adhesive layer comprises a block copolymer comprising a thermoplastic polyurethane block and a block comprising structural units derived from styrene, and (iv) a substrate layer, wherein the coating layer is in contiguous contact with the second layer, and the adhesive layer is in contiguous contact with the second layer and the substrate layer;

said method comprising preparing an assembly of coating layer and second layer, and laminating said assembly adjacent to the adhesive layer coated onto the substrate layer.

23. The method of claim 22 wherein the assembly of coating layer and second layer is formed by coextrusion.

24. The method of claim 22 wherein forming said assembly adjacent to the adhesive layer is performed by lamination.

25. The method of claim 22 wherein the 1,3-dihydroxybenzene is unsubstituted resorcinol.

26. The method of claim 22 wherein the aromatic dicarboxylic acid is selected from the group consisting of isophthalic acid, terephthalic acid, naphthalene-2,6-dicarboxylic acid, and mixtures thereof.

27. The method of claim 26 wherein the aromatic dicarboxylic acid is a mixture of isophthalic acid and terephthalic acid.

28. The method of claim 27 wherein the ratio of isophthalic-derived structural units to terephthalic-derived structural units is about 0.25-4.0:1.

29. The method of claim 28 wherein the ratio of isophthalic-derived structural units to terephthalic-derived structural units is about 0.40-2.5:1.

30. The method of claim 22 wherein the copolyestercarbonate comprises about 10% to about 99% by weight arylate blocks.

31. The method of claim 22 wherein the copolyestercarbonate comprises about 60% to about 98% by weight arylate blocks.

32. The method of claim 22 wherein the carbonate portion of the copolyestercarbonate comprises structural units derived from bisphenol A.

33. The method of claim 22 wherein the second layer comprises a bisphenol A polycarbonate.

34. The method of claim 22 wherein the second layer further comprises a colorant selected from the group consisting of dyes, pigments, metal flakes, and glass flakes.

35. The method of claim 22 wherein the thermoplastic polyurethane block comprises structural units derived from a polyol selected from the group consisting of polyether polyols, polyester polyols, and polyols based on polybutadiene.

36. The method of claim 35 wherein the thermoplastic polyurethane block comprises structural units derived from polymeric methylene diphenyl diisocyanate.

37. The method of claim 22 wherein the thermoplastic polyurethane block comprises an aliphatic polyurethane film.

38. The method of claim 22 wherein the block comprising structural units derived from styrene comprises a hydrogenated styrene-diene block.

39. The method of claim 22 wherein the multilayer article exhibits a ninety-degree peel force of at least 700 Newtons per meter.

40. The method of claim 39 wherein the multilayer article exhibits a ninety-degree peel force of at least 1750 Newtons per meter.

41. The method of claim 22 wherein the substrate layer comprises a material selected from the group consisting of a thermoplastic resin, a thermoset resin, a metal, a ceramic, a glass, and a cellulosic material.

42. The method of claim 22 wherein thicknesses of layers are: a coating layer of about 2-2,500 microns; a second layer of about 2-2,500 microns; and an adhesive layer of about 8-2,500 microns.

43. A method for making a multilayer article comprising (i) a coating layer comprising a block copolyestercarbonate comprising structural units derived from a 1,3-dihydroxybenzene and an aromatic dicarboxylic acid, (ii) a second layer comprising a polymer comprising carbonate structural units, (iii) an adhesive layer comprises a block copolymer comprising a thermoplastic polyurethane block and a block comprising structural units derived from styrene, and (iv) a substrate layer, wherein the coating layer is in contiguous contact with the second layer, and the adhesive layer is in contiguous contact with the second layer and the substrate layer;

said method comprising preparing an assembly of coating layer, second layer, and adhesive layer, and laminating said assembly to the substrate layer.

44. The method of claim 43 wherein the assembly of coating layer, second layer, and adhesive layer is formed by coextrusion.

45. The method of claim 43 wherein forming said assembly adjacent to the substrate layer is performed by lamination.

46. The method of claim 43 wherein the coating layer comprises a 1,3-dihydroxybenzene selected from the group consisting of unsubstituted resorcinol, 2-methyl resorcinol, and mixtures thereof.

47. The method of claim 46 wherein the 1,3-dihydroxybenzene is unsubstituted resorcinol.

48. The method of claim 43 wherein the aromatic dicarboxylic acid is selected from the group consisting of isophthalic acid, terephthalic acid, naphthalene-2,6-dicarboxylic acid, and mixtures thereof.

49. The method of claim 48 wherein the aromatic dicarboxylic acid is a mixture of isophthalic acid and terephthalic acid.

50. The method of claim 49 wherein the ratio of isophthalic-derived structural units to terephthalic-derived structural units is about 0.25-4.0:1.

51. The method of claim 49 wherein the ratio of isophthalic-derived structural units to terephthalic-derived structural units is about 0.40-2.5:1.

52. The method of claim 43 wherein the copolyestercarbonate comprises about 10% to about 99% by weight arylate blocks.

53. The method of claim 43 wherein the copolyestercarbonate comprises about 60% to about 98% by weight arylate blocks.

54. The method of claim 43 wherein the carbonate portion of the copolyestercarbonate comprises structural units derived from bisphenol A.

55. The method of claim 43 wherein the second layer comprises a bisphenol A polycarbonate.

56. The method of claim 43 wherein the second layer further comprises a colorant selected from the group consisting of dyes, pigments, metal flakes, and glass flakes.

57. The method of claim 43 wherein the thermoplastic polyurethane block comprises structural units derived from a polyol selected from the group consisting of polyether polyols, polyester polyols, and polyols based on polybutadiene.

58. The method of claim 57 wherein the polyurethane comprises structural units derived from polymeric methylene diphenyl diisocyanate.

59. The method of claim 43 wherein the polyurethane comprises an aliphatic polyurethane film.

60. The method of claim 43 wherein the block comprising structural units derived from styrene comprises a hydrogenated styrene-diene block.

61. The method of claim 43 wherein the multilayer article exhibits a ninety-degree peel force of at least 700 Newtons per meter.

62. The method of claim 61 wherein the multilayer article exhibits a ninety-degree peel force of at least 1750 Newtons per meter.

63. The method of claim 43 wherein the substrate layer comprises a material selected from the group consisting of a thermoplastic resin, a thermoset resin, a metal, a ceramic, a glass, and a cellulosic material.

64. The method of claim 43 wherein thicknesses of layers are: a coating layer of about 2-2,500 microns; a second layer of about 2-2,500 microns; and an adhesive layer of about 8-2,500 microns.

* * * * *